UNITED STATES PATENT OFFICE.

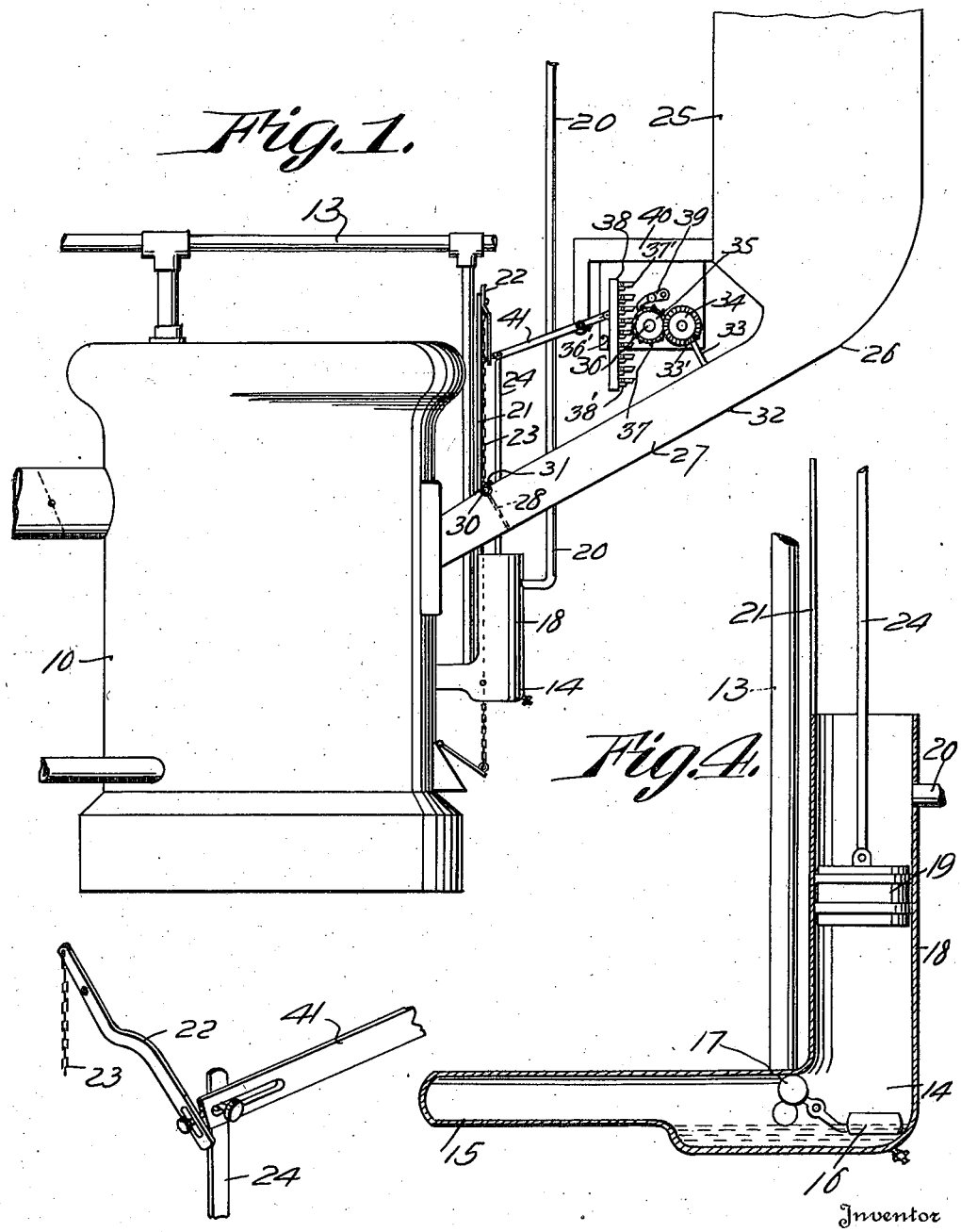

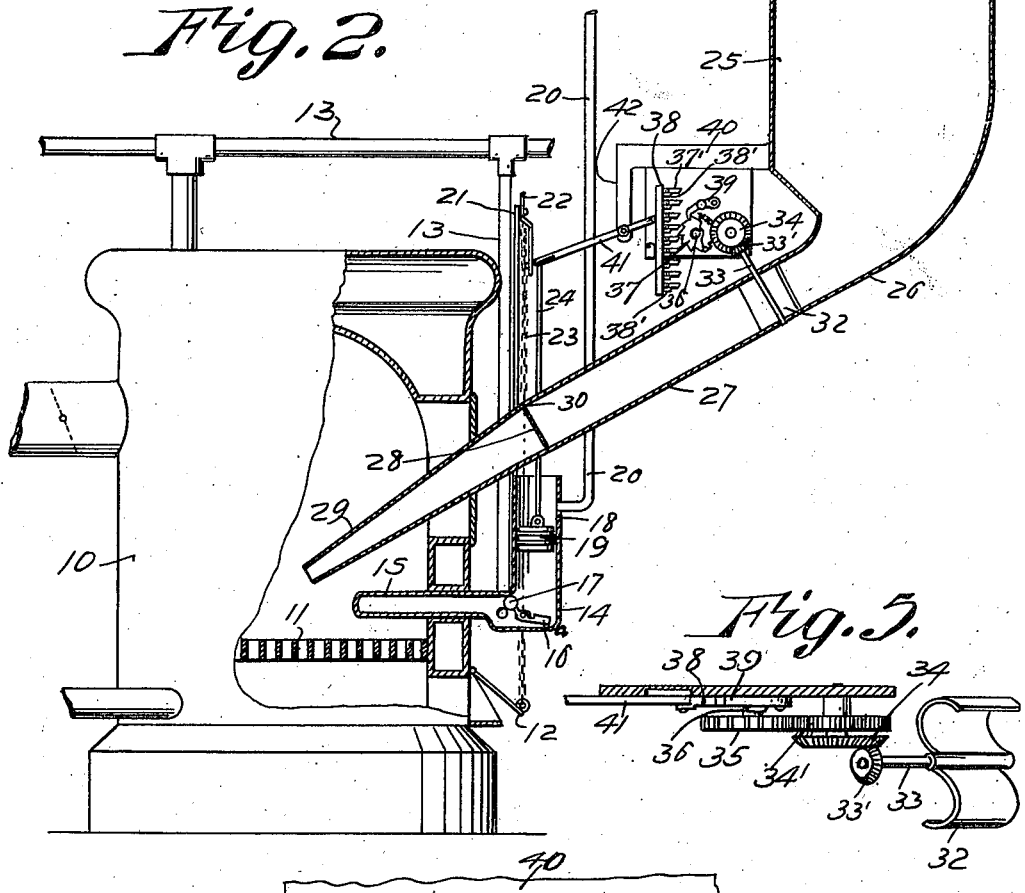
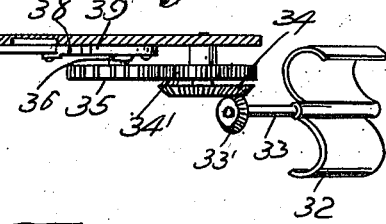
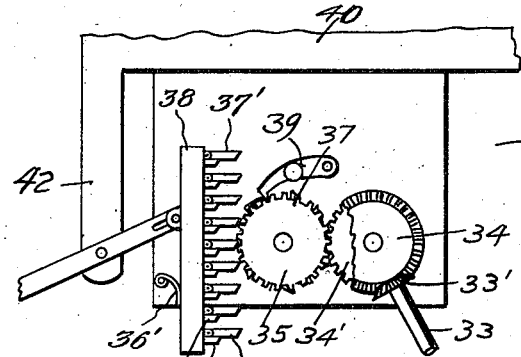

LAWRENCE M. SCHNEIDER, OF BAUDETTE, MINNESOTA.

AUTOMATIC FURNACE DRAFT AND FUEL REGULATOR.

1,275,096.  Specification of Letters Patent.  Patented Aug. 6, 1918.

Application filed January 18, 1917. Serial No. 143,152.

*To all whom it may concern:*

Be it known that I, LAWRENCE M. SCHNEIDER, a citizen of the United States, residing at Baudette, in the county of Beltrami and State of Minnesota, have invented certain useful Improvements in Automatic Furnace Drafts and Fuel Regulators, of which the following is a specification, reference being had therein to the accompanying drawing.

The present invention relates to furnaces, and has particular reference to an automatic device for regulating the draft of the furnace and the feeding of fuel thereto for the purpose of maintaining a uniform temperature in the furnace.

An object of the present invention is to provide an easily installed and practical apparatus which may be controlled by steam pressure to regulate the draft and the feeding of coal to the furnace, and which may be readily applied to furnaces of ordinary construction without changing or altering the same.

Other objects and advantages of this invention, as well as the above, will be more clearly brought out in the following specific description of the present preferred embodiment of the invention, the same being illustrated in the accompanying drawings, wherein—

Figure 1 is a side elevation of a furnace having the improved draft and fuel controlling device applied thereto.

Fig. 2 is a longitudinal vertical section taken through the furnace and the improved apparatus.

Fig. 3 is a detail, enlarged view showing the fuel feeding device.

Fig. 4 is a sectional view showing the controlling device.

Fig. 5 is a top edge view of the fuel feeding device.

Fig. 6 is a detail perspective view of the controlling lever connection.

Referring to these drawings, wherein like parts are designated by similar numerals of reference throughout the several views, 10 designates a furnace of ordinary construction, provided with grate bars 11 forming an ash-pit therebeneath, and having a draft door 12 controlling the draft through the ash pit upwardly through the furnace. In the present instance, the furnace 10 is shown to be of that type used for hot water systems, and the furnace is provided with a branch water pipe 13, which leads into a drum 14 arranged at one side of the furnace 10, and connected to the interior thereof by means of a neck 15. The pipe 13 opens into the drum 14 adjacent to the bottom of the latter.

A float 16 is pivoted in the drum and carries a disk 17, adapted to close the lower end of the pipe 13 when the float 16 is raised. The drum 14 is provided in its top with an upwardly extending cylinder 18, in which is disposed a piston 19, the latter being suitably packed in the cylinder to prevent leakage of steam upwardly about the piston.

The piston 19 is adapted, under excessive pressure, to move into the extreme top of the cylinder 18. When in such position, the steam beneath the piston 19 is permitted to escape through a vent 20 formed in the side of the cylinder 18 beneath the piston when in its raised position.

The vent 20 may be in the form of a pipe which is led to any suitable point of discharge.

A bracket arm 21 rises from the top of the cylinder 18 and has pivotal engagement with the intermediate portion of a lever 22. One end of the lever 22 is connected by a chain 23 to the draft door 12. The opposite end of the lever 22 is connected, by a pin and slot connection, to the upper end of a plunger rod 24, which extends upwardly through the cylinder 18 from the piston 19.

At a suitable distance from the furnace 10 is arranged a hopper 25 adapted to contain coal or other fuel for the furnace. The hopper 25 has an inclined bottom 26, terminating at its lower end in a chute 27, which inclines downwardly to the fuel door 28 of the furnace. A chute extension 29 extends into the furnace from the door 28, and is adapted to deliver the fuel upon the grate bars 11. The door 28 is mounted on the hinge 30, and is maintained normally closed by a spring 31. The spring 31 is of such resistance as to hold the door 28 closed, and to permit of the automatic opening of the same when a quantity of the fuel moving down the chute 27 strikes the door. A combined feeder and gate 32 is mounted upon the lower end of the hopper 25 and comprises a pair of opposed plates, which are curved transversely to form scoops, and which are fixed upon a shaft 33. The shaft 33 is journaled at its opposite ends upon the hopper 25, and is provided upon one end with a pinion 33' meshing with a gear wheel 34 connected to a gear wheel 34'. A second gear wheel 35, meshing with the gear wheel 34', is mounted on a shaft 36, suitably supported upon the lower end of the hopper. The shaft 36 carries a ratchet wheel 37, adapted to be engaged by a rack bar 38, and to be rotated in one direction thereby.

For this purpose the elongated engaging teeth 37' of the rack bar 38 are pivoted to the bar at their inner ends and prevented from swinging downwardly beyond a plane at right angles to the rack bar by means of the short integral teeth 38' alternately arranged on the rack bar with respect to the pivoted teeth. The teeth are so spaced however that the rack bar 38 when moved downwardly will slide freely over the ratchet wheel 37 without turning the same. A spring 36' serves to force the elongated teeth of the rack bar against the straight teeth of the ratchet wheel.

The ratchet wheel 35 is held from retrograde-movement by means of a dog 39, suitably mounted upon a bracket frame 40, erected adjacent to the hopper 25.

The rack bar 38 is pivotally mounted upon one end of a lever 41, which is hinged between its ends to an arm 42 of the bracket. The opposite end of the lever 41 has pivotal connection with the upper end of the plunger rod 24, and is adapted to be rocked upon the rise and fall of the latter.

In operation, water from the pipe 13 enters the drum 14 until the float 16 rises to a position substantially half-way between the top and bottom of the drum. When in this position, the disk 17 closes the pipe 13 and prevents further entrance of water. Heat passes from the furnace through the neck 15 and maintains the water in the drum 14 in a boiling condition. The steam in the drum 14 works against the lower surface of the piston 19 and raises the same, the piston being weighted. The rise of the piston moves the rod 24 upwardly through the cylinder 18, and rocks the lever 22 for relaxing the chain 23 and permitting the draft door 12 to close by its own weight.

At the same time, the upward movement of the rod 24 swings the lever 41 to carry the rack bar 38 downwardly without rotating the ratchet wheel 37.

As soon as the heat of the furnace decreases, the steam in the drum 14 is diminished and the piston 19 is permitted to drop. This downward movement of the piston 19 brings the adjacent ends of the levers 22 and 41 downwardly, and opens the draft door 12, and raises the rack bar 38. The rack bar 38, when moved upwardly turns the gears 35 and 34 respectively to rotate the shaft 33 and turn the combined feeder and gate 32. This movement of the feeder and gate discharges a quantity of fuel from the hopper 25 into the chute 27. The fuel slides down the chute, strikes the fuel door 28, opens the same, and is finally discharged into the inner chute section 29, which directs the fuel onto the grate bars.

It is thus seen that the apparatus is automatic in its action to both control the draft upwardly through the furnace and to control the feeding of fuel to the furnace.

It is of course understood that various changes, and modifications may be made in the structure and arrangement of the above specifically described parts comprising the invention, without departing from the spirit thereof, and being limited only by the scope of the following claims.

What is claimed is:

1. The combination with a hot water furnace having a draft door, of a drum positioned within the furnace, automatic means for intermittently effecting communication between the drum and the water compartment of the furnace to supply the drum with water for conversion into steam, a cylinder connected with the drum, a piston in the cylinder and operable by the pressure of the steam in the drum, means operatively connecting the piston and the draft door to close the latter upon movement of the former by steam pressure, a fuel regulator, and connections between the piston and the regulator whereby fuel may be fed to the furnace upon backward movement of the piston due to a decrease of steam in the cylinder.

2. The combination with a hot water furnace, of a fuel hopper connected with the furnace, a combined feeder and gate connected to the hopper to control the passage of fuel to the furnace, gears connected to said combined feeder and gate, a ratchet wheel connected to said gears and mounted for turning movement in one direction only, a lever pivoted at an intermediate point in the direction of its length, a rack bar mounted upon one end of the lever so that it may traverse the ratchet wheel when moved in one direction and intermesh with said wheel when moved in the opposite direction, a steam controlled device connected to the furnace and to the remaining end of the lever whereby the latter is rocked, and automatic means for intermittently establishing communication between the steam controlled device and the hot water compartment of the furnace so that the said device may be supplied with water for conversion into steam.

3. The combination with a furnace for hot water heating, of a drum positioned within the furnace and having an opening in communication with the water compartment of said furnace, a valve opening and closing said opening, a float within the drum and connected to the valve, so that the opening may be closed after water in the drum has reached a prescribed level, a vertical cylinder connected with the drum, a piston arranged in the cylinder and adapted to be raised by steam generated in the drum, a lever connected to the piston at one end, a rack bar connected to the opposite end of said lever, means for pivotally supporting the lever between its ends, a vent pipe connected with the other end of the cylinder, so that the cylinder may not be forced upward beyond a certain point and a one-way operating fuel controlling device mounted for engagement with said rack bar, whereby the fuel controlling device may remain inactive on the upward movement of the piston but rendered active on the downward movement thereof due to the decrease of steam in the drum.

In testimony whereof I affix my signature.

LAWRENCE M. SCHNEIDER.